Patented Dec. 8, 1931

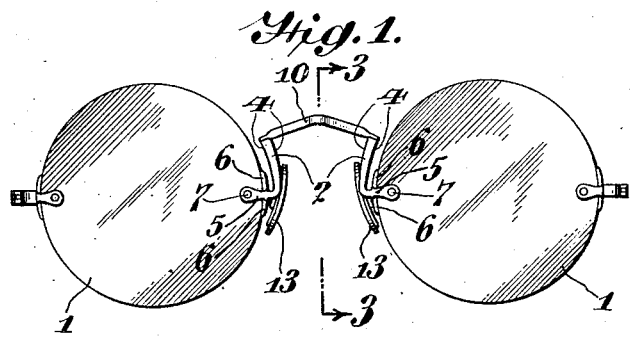
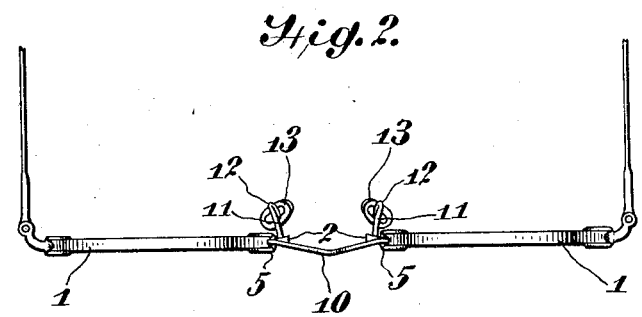
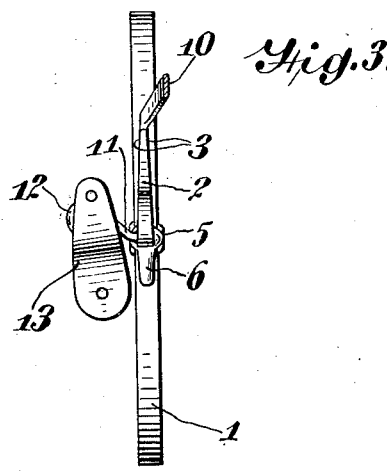

1,835,529

UNITED STATES PATENT OFFICE

FRANK D. ROONEY, OF CLEVELAND, OHIO

OPHTHALMIC MOUNTING

Application filed December 19, 1930. Serial No. 503,421.

My invention relates broadly to ophthalmic mountings but more particularly to bridges for spectacles and eye-glasses.

The general object of the invention is to provide a bridge for spectacles and eyeglasses of artistic and pleasing appearance and which also embodies means for preventing the sagging of the lenses when in use, but which at the same time permits horizontal movements, which may be described as pivotal, of the opposite end portions of the bridge structure and the lenses secured thereto.

It also is an object of the invention to provide a bridge structure for spectacles and eyeglasses in which the spanning portion thereof is resilient and yielding horizontally and unyielding vertically and in which the opposite ends of the said spanning portion are connected to the upper ends of rugged and rigid posts which are connected at their lower ends to the lenses of the spectacles or eyeglasses.

To the foregoing and other ends the invention comprehends the construction as hereinafter described in detail, particularly point out in the claims and as illustrated in the drawings wherein I have shown an embodiment of the invention in a form which at present is preferred by me. However, it will be understood that the invention is susceptible of embodiment in other forms of construction than that shown and that changes in the details of construction may be made within the scope of the claims without departing from the invention or the principle thereof.

In the drawings:

Fig. 1 is a view in front elevation of a pair of spectacles having an ophthalmic mounting embodying the invention;

Fig. 2 is a top plan view of the pair of spectacles shown in Fig. 1; and

Fig. 3 is a transverse vertical section taken on the line 3—3 of Fig. 1.

In the drawings I have shown a pair of spectacles including rimless lenses 1 but it will be understood that if desired these lenses may be provided with rims. The said lenses are connected together by means of a bridge structure or ophthalmic mounting embodying the invention. The said bridge structure comprises at its opposite ends upwardly extending rugged and rigid posts 2. The front and rear sides of these posts are tapered from the lower ends thereof upwardly as shown at 3, while the inner and outer sides thereof are tapered from their upper to their lower ends as shown at 4. The design of these posts is such as to provide ruggedness and strength and yet at the same time preserve and even add to the artistic effect and appearance of the bridge structure. The lower ends of the posts 2 are connected by soldering or otherwise to the inner ends of the straps 5 from the opposite edges of which projections 6 extend which engage the edges of the lenses and aid in holding the latter against pivotal movement about the fastening screws 7 by means of which the said straps are secured to the said lenses.

The spanning portion 10 of the bridge structure consists of a relatively thin strip of metal the width of which is considerably greater than the thickness thereof as is apparent from the drawings. In the manufacture of the mounting the portions 2 and 10 consist of separate pieces and the opposite ends of the spanning portion 10 are secured to the upper ends of the posts 2 by soldering or otherwise as may be found most practical. The parts of the spanning portion 10 on opposite sides of the middle thereof extend slightly forwardly from their points of connection to the upper ends of the posts 2 to form an angular bend as is shown in the drawings. The opposite sides of the spanning portion 10 occupy planes which, when the spectacles are being worn, extend in a vertical or very nearly vertical direction.

For the purpose of supporting the spectacles or eye-glasses upon the nose of the wearer I have provided arms 11 the front ends of which are connected to the lower ends of the posts 2 and to the inner ends of the straps 5, while the rear end portions thereof are bent as indicated at 12. To the ends of the said bent portions nose gripping pads 13 are connected. This connection may or may not be pivotal as may be desired.

The spanning portion 10 of the mounting, being arranged so that when the spectacles are in use the wider dimension thereof will occupy a practically vertical plane, operates to support the lenses fastened to the opposite ends of the bridge against sagging. That is to say, the said lenses will retain the horizontal positions to which they may be adjusted in the fitting of the spectacles to the eyes of a person who is to wear the same. In other words, the spanning portion of the bridge acting through the posts 2 constitutes a rigid support for the lenses with respect to a vertical plane; that is, a plane in general parallel relation to that of the lenses. Such rigidity in a vertical direction does not interfere with the horizontal yielding of the spanning portion of the bridge to facilitate the positioning of the nose gripping pads of the spectacles or glasses upon the nose of a wearer. The yielding and resilient characteristics of the spanning portion 10 due largely to the form and arrangement of the angular bend intermediate its ends, permit the spreading apart of the nose gripping pads 13 when it is desired to place the latter in a proper position upon the nose to support a pair of spectacles or eye-glasses.

In the construction as illustrated the posts 2 converge from their upper ends downwardly as best shown in Fig. 1 of the drawings.

It will be seen that by my invention I have provided an ophthalmic mounting for bridging the space between the lenses of a pair of spectacles or glasses and connecting the said lenses to each other which is of artistic and pleasing appearance, which possesses the requisite rigidity in a vertical plane having reference to the plane of the lenses, and which is yielding horizontally to permit the ready placing of the nose gripping pads 13 in the positions desired upon the nose of a wearer.

It will also be seen that the provision of an angular bend of the character described intermediate the ends of the spanning portion of the bridge piece, with the two sections of the spanning portion on each side of the bend diverging rearwardly to their points of connection to the posts results in a construction in which the outer edges of the lenses may easily be bent forwardly when the temple pieces are grasped by the user to position the pads 13 on the nose. It will be noted, furthermore, that this angular bend is so arranged as to permit the necessary freedom of movement of the outer edges of the lenses in a horizontal direction without any undesirable movement of the outer edges of the lenses in a vertical direction. This arrangement of the angular bend operates to brace the spanning portion and prevents it from "setting" or being permanently distorted by the flexing movements to which such a construction is ordinarily subjected in use. I have found that this result is not attained in prior mountings in which the spanning portion is in a plane throughout its length, nor is it attained with those mountings in which the spanning portion is in the form of a curve from post to post.

Having thus described my invention what I claim and desire to secure by Letters Patent is:

1. An ophthalmic mounting for spectacles and eye-glasses consisting of a bridge structure having rigid posts which extend upwardly in the plane of the lenses the lower ends of which are connected to the said lenses, and a spanning portion connected at its opposite ends to the upper ends of said posts, the said spanning portion consisting of a thin strip of metal having an angular bend at its middle dividing it into two sections which diverge rearwardly from the bend to their points of connection to said posts in the plane of the lenses, the thickness of said strip in a direction substantially at right angles to the plane of the lenses being substantially less than the width of said strip in the direction of the plane of the lenses.

2. An ophthalmic mounting for spectacles and eye-glasses consisting of a bridge structure having at its opposite ends rigid posts which are located in the plane of the lenses of the spectacles or eye-glasses, the lower ends of which are connected to the lenses of the spectacles or eye-glasses at points in opposed relation to each other, and a spanning portion consisting of a thin resilient metal strip connected at its opposite ends to the upper ends of the said posts, and having an angular bend at its middle dividing it into two sections which diverge rearwardly from the bend to their points of connection to said posts in the plane of the lenses, the thickness of said strip in a direction substantially at right angles to the plane of the lenses being substantially less than the width of said strip in the direction of the plane of the lenses, the said strip being resilient in directions transversely of the plane of the said lenses and rigid in a direction in general parallel relation to the plane of the said lenses.

3. An ophthalmic mounting consisting of a bridge structure for spectacles and eye-glasses, the said mounting comprising rigid posts at its opposite ends the front and rear sides of which posts taper from their lower ends upwardly while the inner and outer sides thereof taper from their upper ends downwardly, means for connecting the lower ends of said posts to the inner edges of the lenses of a pair of spectacles or eye-glasses, and a spanning portion connected at its opposite ends to the upper ends of the said posts, the said spanning portion consisting of a strip of flat resilient metal having an angular bend intermediate its ends dividing it into two sections which diverge rearwardly from the bend to their points of connection to said posts in the plane of the lenses, the thickness of said strip in a direction substantially at right angles to the plane of the lenses being substantially less than the width of said strip in the direction of the plane of the lenses, said strip being resilient in directions transversely of the plane of the lenses and rigid in a plane parallel with the plane of said lenses.

4. An ophthalmic mounting for spectacles and eye-glasses consisting of a bridge structure having rigid posts which are connected at their lower ends to the inner edges of the lenses of said spectacles or eye-glasses and extend upwardly therefrom, the said posts diverging from their lower to their upper ends, and a spanning portion connected at its opposite ends to the upper ends of said posts, the said spanning portion consisting of a thin strip of resilient metal having an angular bend at its middle dividing it into two sections which diverge rearwardly from the bend to their points of connection to said posts in the plane of the lenses, the thickness of said strip in a direction substantially at right angles to the plane of the lenses being substantially less than the width of said strip in the direction of the plane of the lenses.

In testimony that I claim the foregoing as my invention I have hereunto signed my name this 15th day of December, 1930.

FRANK D. ROONEY.